May 17, 1960    C. R. MINER    2,936,630
VARIABLE SPEED TRANSMISSION
Filed March 31, 1955    2 Sheets-Sheet 1
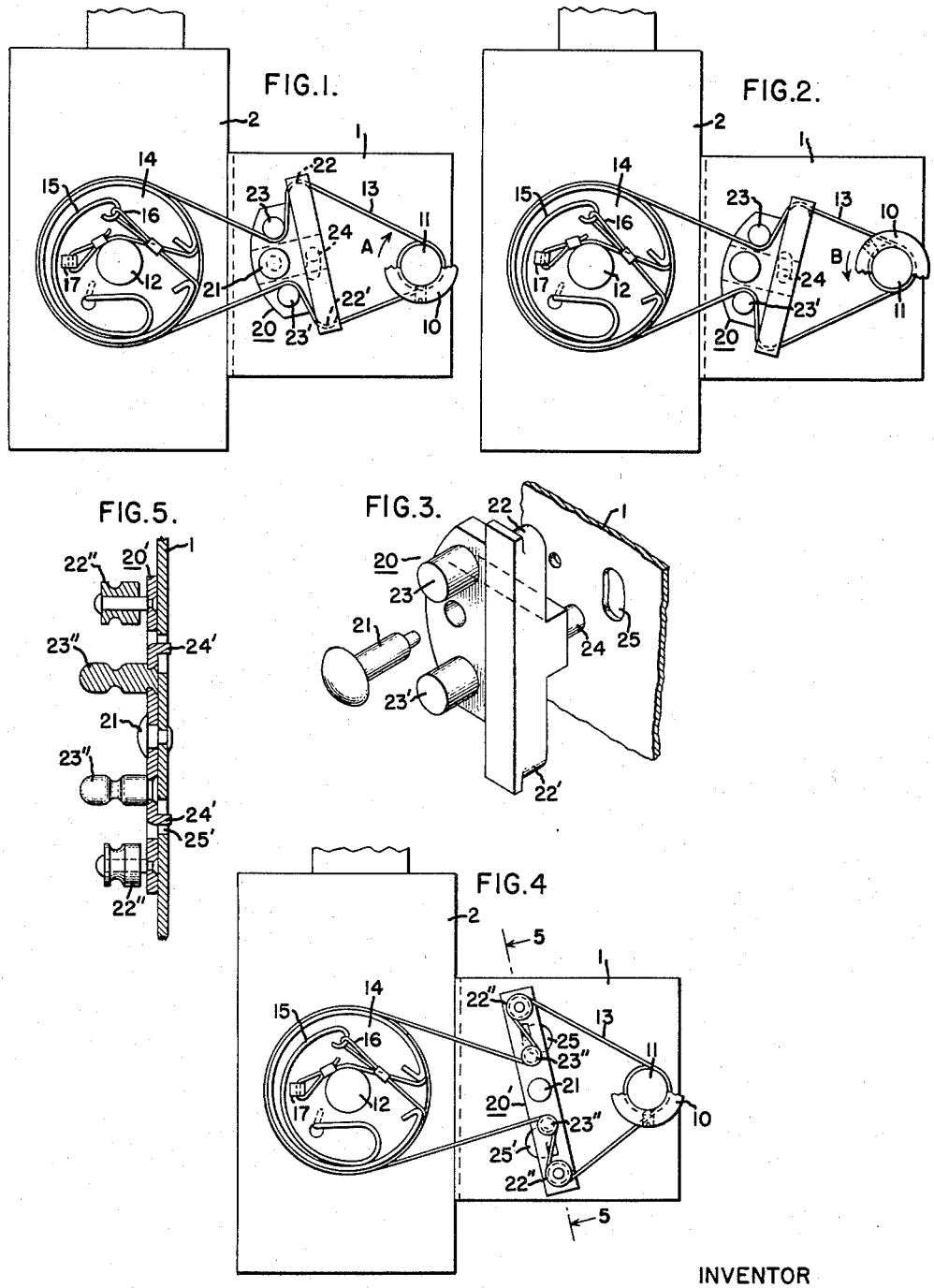
INVENTOR
CARROLL R. MINER,
BY Donald N. Timbie
HIS ATTORNEY.

May 17, 1960 C. R. MINER 2,936,630
VARIABLE SPEED TRANSMISSION
Filed March 31, 1955 2 Sheets-Sheet 2

INVENTOR:
CARROLL R. MINER,
BY Donald N. Timbie
HIS ATTORNEY.

United States Patent Office 2,936,630
Patented May 17, 1960

2,936,630

VARIABLE SPEED TRANSMISSION

Carroll R. Miner, Liverpool, N.Y., assignor to General Electric Company, a corporation of New York Application March 31, 1955, Serial No. 498,297

8 Claims. (Cl. 74—10.5)

This invention relates to multi-speed transmission systems or more particularly to where it is desired to have high and low speed movements. Such a choice of movements may be desirable in devices for coarse and fine adjustment.

Numerous mechanical movements are available for varying the speed of transmission systems. Prior art mechanisms include interchangeable gear trains, multiple pulleys, flexible drives, planetary gears, multiple shafts and various slip clutch devices. Each of these, while possessing advantages in a large number of applications, are not convenient or expedient in all situations. As a rule they cannot be used with overall optimum advantage in recorders, timers, regulators, or in radio and television transmitters and receivers. In such applications it may be found that space for the placement of components is limited. Furthermore, the amount of force required to make the desired adjustment is usually not sufficient to warrant the expense of devices inherently capable of transmitting large forces and those prior art devices which can be constructed to result in the degree of fine adjustment desired involve considerable expense and care in their design and fabrication. Such considerations sometimes compel designers of mass produced devices to omit coarse and fine adjusting means or to resort to a complex and expensive construction. Of course, a multi-speed transmission device suitable for application in the situations described immediately above, due to its size and simplicity need not be limited to such uses for merely by using material of desired dimensions and strength it would have universal application.

A particular situation in which it is desirable to have a means of coarse and fine adjustment is in the field of radio and television receivers. A specific device in which a coarse and fine adjustment is convenient is the tuner utilized in a television receiver capable of receiving signals in the ultra high frequency range. Of the large number of channels available in this range only one, two or three may be assigned to a given locality in which such a receiver is located. Since the channels in any one locality are separated pretty far apart over the entire available range, in order to prevent interference, a person desiring to tune such a receiver would like to cover rapidly those channels not available but would at the same time like to accurately tune a channel he can receive. It has been possible through the provision of two separate shafts and dials to obtain this result, that is, the operator makes a coarse adjustment by turning one shaft and its transmission system and a fine adjustment by turning another shaft and its transmission system. This technique is obviously not as advantageous as one which utilizes a single shaft rotated by the operator, for providing for the two desired adjustments.

Therefore it is an object of this invention to provide an improved multi-speed transmission device in which the rotation of a driven member relative to a driving member can be varied by turning a single driven shaft.

It is another object of this invention to provide an improved multi-speed transmission system suitable for use in installations wherein simplicity, cost and compactness are factors to be considered.

It is still another object of this invention to provide a multi-speed transmission system particularly suitable for application in radio and television receivers to obtain fine and coarse adjustment thereof.

Briefly stated, the objects of this invention may be achieved in a transmission system comprised of at least a pair of rotatable members, one of which constitutes a driving member. A pivoted lever is provided in the system and has guides mounted thereon. A flexible element interconnects the rotatable members and the guides on the lever. The lever may be limited in its movement by stops and is pivoted between the stops by a component of the force developed by the friction of the flexible element where it passes over the guides. The normal relative speed of the driving member and the other rotatable members will be determined by their respective dimensions. During a portion of the motion of the driving member, the lever will pivot and one relative speed of the driving member and the other rotatable elements, which is a deviation from their normal relative speed, will be obtained. After reaching the limit of its movement, the lever ceases to pivot and the normal relative speed of the driving member and the other rotatable elements will be obtained.

The features of my invention which I believe to be novel are set forth with particularity in the appended claims. My invention itself, however, both as to its construction and method of operation together with further objects and advantages thereof may be best understood by reference to the following description taken in connection with the accompanying drawing in which:

Figure 1 is a front view of a flexible drive transmission system incorporating my invention;

Figure 2 is a view similar to Figure 1 wherein the lever incorporating my invention has been rotated to a second position to illustrate the fine adjustment possible;

Figure 3 is an exploded view in perspective of a lever used in my invention;

Figure 4 is a view similar to Figure 1 and illustrates another form my invention may take;

Figure 5 is a view along the lines 5—5 of Figure 4 showing details of the modified lever construction;

Figure 6:
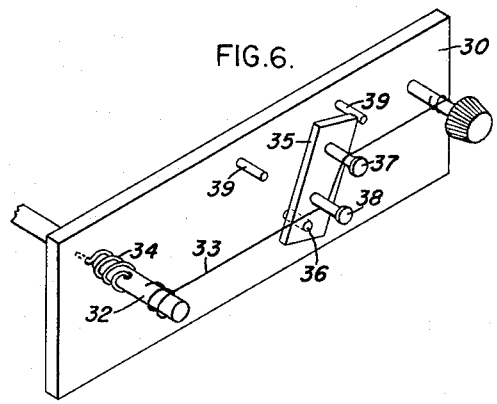
Figure 6 is isometric view of a different embodiment of my invention.

Referring now to Figures 1 and 2 of the drawing, there is shown a transmission system incorporating my invention. The transmission system in this instance is mounted on a bracket or chassis 1 forming a part of a television receiver. This particular arrangement shown is for purposes of illustration only, as it is to be understood that the drive system has utility in other applications wherein fine and coarse adjustments are desired, or in any other kind of television or radio device. In fact, the multi-speed drive system itself is to be considered to have a wide range of application and any references to coarse and fine adjustment purposes should not be considered a limitation but merely for the purposes of illustration. A tuner, indicated by reference numeral 2, is a part of this receiver and is connected to the remainder of the television assembly by any desirable means.

A knob 10 is mounted on a drive shaft 11. The drive shaft in turn is mounted in the support 1 by any suitable means for rotation therein. In the illustration in Figures 1 and 2 a driven shaft 12 is mounted in the tuner 2 by any suitable means for rotation therein and is connected to the drive shaft 11 by means of a flexible element herein indicated as being cable 13. The flexible cable itself is merely one way of connecting the driving member and the driven member. This may be done by a cable as shown, by a chain or by any desired means. The cable is trained around a pulley 14 mounted on the driven shaft 12 and is connected at one end 16 to a spring element 15 for the purpose of maintaining suitable tension in the cable, while the other end of the cable is attached to a bent lug 17 provided for that purpose on the pulley 14.

The drive system illustrated is simply one form in which my invention may be used. It may be desired for instance, to provide other shafts in addition to the shaft 12 to be driven by the drive shaft 11. Such other shafts may be for the purpose of rotating indicators associated with a tuning device 2.

A speed changing device incorporating my invention includes a lever or plate indicated by reference numeral 20. In the form shown it is pivoted on the support means 1 by means of a lug or rivet 21 and is essentially loosely mounted thereon for free movement thereabout. The pivoted lever 20 is provided with first guides 22 and 22' spaced from the pivot 21 on either side thereof. Second guides 23 and 23' are provided on the lever 20 and are mounted in between the guides 22 and 22' respectively and the pivot 21. The flexible drive cable 13 after being wound around the shaft 11 as desired is trained outside the upper guide 22, inside the other guide 23, around such driven shafts as may be desired and, as shown in Figures 1 and 2, around the pulley 14, inside the lower guide 23' and outside the lower guide 22' and back to the drive shaft 11.

Figure 3 of the drawing shows the lever element of my speed changing device illustrated in Figures 1 and 2 in an exploded view to illustrate the means utilized for limiting its movement. In this form of the invention the stop means comprises a projection or lug 24 extending from the lever 20 and adapted to engage in an arcuate slot 25 formed in the support 1.

In the operation of my device, it may be assumed that the initial position of the elements is that shown in Figure 1. In this position the lever 20 has been pivoted to the extremity of its counter-clockwise movement as it is prevented from going further by the action of the lug 24 engaging the upper end of the arcuate slot 25. If it is desired to have initial slow movement of the driven members, the driving shaft 11 is rotated in a clockwise direction as shown by the arrow A. Because of the manner in which the cable 13 is wound in the embodiment in Figures 1 and 2, that is, where the upper strand of the cable 13 approaches the shaft 11 on its upper side, the upper strand will be moved toward the right hand side of the figure. Since the cable 13 is maintained under tension by means of the spring 15 and additional tension is added due to the rotation of the shaft 11, friction will be developed where the cable rides over the upper guide means 22. The component of this friction perpendicular to the lever 20 will cause the lever to move clockwise about its pivot 21 toward the shaft 11. At the same time it will be seen that the lower surface 22' will move clockwise away from the shaft 11. Disregarding whatever insignificant slippage may occur between the cable and the guides 22 and 22', it will be seen that the total length of cable strand between guides 22 and 22' will remain the same during this phase of the operation. As the guides 22 and 22' are rotated toward and away respectively, from the shaft 11, the secondary guide elements 23 and 23' will be similarly rotated. Since there is tension throughout the length of the cable 13, friction will act to prevent relative movement of the guide 23 and the cable 13. Therefore, as the guide 23 moves toward the drive shaft 11 and away from the driven shaft 12 it will move that portion of the cable extending to the left in the drawing along with it. As the left hand portion of the cable moves toward the shaft 11, it rotates the pulley 14 and shaft 12 clockwise. As in the case of the cable length extending between guides 22 and 22', the cable length extending from guides 23 and 23' remains constant. The additional amount for the increasing cable length between guide 23 and its point of contact with the pulley 14 is furnished by the decreasing amount extending from the guide 23' to its point of contact with the pulley 14 as it moves to the left.

The action described in the immediately preceding paragraph continues until the projection 24 on the lever 20 contacts the bottom of the slot 25 and further clockwise movement of the lever is prevented. At this point further rotation of the shaft 11 will continue to wind the cable therearound and the pulley 14 will be rotated as the cable slips over the guides 22, 22' and 23, 23'.

It will be seen that with the shaft and pulley diameter proportioned as shown in Figures 1 and 2 and the shaft 11 constituting the driving shaft the entire assembly is a speed reduction device. It will further be seen that since the length of the lever arm from the pivot 21 to the guide 22 is greater than that between the pivot 21 and guide 23 greater cable travel will be had around shaft 11 than around pulley 14 when the lever is pivoting within the limits determined by the setting of its stops. Thus, in addition to the speed reduction normally present, an additional speed reduction will be had during this pivoted movement.

In Figure 2 the lever 21 has reached the clockwise extremity of its permissible movement. A rotation of the shaft 11 in the direction indicated by arrow B will result in the mode of operation described above but in a reverse direction. The projection 24 upon engaging the upper limit of the slot 25 stops the movement of the lever 20 and movement of the cable 13 relative to the guides 22, 22' and 23, 23' drives the shaft 12 and pulley 14 in accordance with the normal speed as determined by their respective dimensions.

It can be seen that when lever 20 is in either one of the extreme limits of movement, a reversal in the direction of rotation will cause, first a relatively small movement of the driven shaft 12 relative to the drive shaft 11, and upon reaching the other extremity of its pivoting movement a greater relative movement of the driven shaft 12 will result. While if the lever 20 should be found in an intermediate position, the initial rotation in either direction will result in the relatively small movement of the driven shaft until an extremity is reached and the greater or high speed movement of the driven shaft will be produced.

In the application of this transmission system to a tuning system for a radio or television receiver, the above described operation conforms to a standard approach by most individuals tuning in and out various channels. That is to say, it seems to be a common practice for a person tuning a receiver to approach his desired station at a high speed until he reaches the vicinity of the desired station and then makes his fine adjustment. Many times he will go beyond his station. He then returns to the station in which he is particularly interested. In the operation of this device, after he has overtuned using the high speed or coarse adjustment, the automatic provision upon reversing direction of the tuner for the low speed or fine adjustment conforms to this conventional use.

The above description has proceeded assuming that the shaft 11 is the driving shaft and that the shaft 12 and pulley 14 are the driven or load means. With this mode of operation, the system is a speed reducing device and the action of the lever permits a relative speed lower than that normally available. However, such a device could be operated so that the shaft 12 and pulley 14 are the driving means and the shaft 11 the driven load. When used in this manner, the device is a speed increasing mechanism when the lever 20 is pivoting. In any case, the pivoting of the lever 20 of the speed changing device produces a deviation from the normal relative speed of the driving and driven elements as determined by their dimensions.

The material out of which the lever or speed changing device 20 may be formed is not considered to be limited. However, since it is the frictional force which pivots the lever 20, a surface which provides a sufficient frictional force, when all of the factors such as shaft diameters and cable tension are considered, is all that is required. A form which has proven satisfactory is that illustrated in Figure 3 which comprises an integral construction moulded out of a suitable plastic material such as nylon. However, the material and its shape may vary depending upon the other requirements of the system.

Another embodiment of the invention is that form illustrated in Figure 4 wherein a lever 20' has been interposed in the drive system shown in Figures 1 and 2 and is pivoted as at 21. In this form the guides 22'' are pulleys mounted on studs extending from the lever and guides 23'' are grooved projections extending from the lever 20' and aligned with the guides 22''. It has been found desirable in this instance to make one set of guides in the form of pulleys and the other set of guides in the form of rigid members over which the cable 13 may slip because of the frictional requirements for the operation of the device. As pointed out above, sufficient friction is required in order to cause the lever to pivot but at the same time it is not desired to have excessive friction as this would make the high speed rotation of the driven members difficult. The limiting means in this form comprises lugs 24' bent downwardly from the lever 20' and extending into holes 25' formed in the supporting means. The means for limiting the movement of the lever may take any suitable form. For example, it may be as shown in Figures 1 and 4 or, alternatively, projections mounted on the support means may engage the lever and thereby limit its movement.

While it may be found convenient and desirable to provide stops to limit the movement of the lever 20 in some situations, necessary in others, they are not required in all situations. It is clear, from an inspection of Figures 1 and 2, that after the lever has rotated past a vertical position, the included angle between the segments of the cable 13 on ether side of the guide 22 is increasing. The turning component of the frictional force thereby developed at the guide 22 decreases. If the lever is rotated far enough in the same direction, the turning force will decrease until it is of such a magnitude that it will no longer be sufficient to further rotate the lever. At the same time the included angle between the segments of the cable 13 on either side of the guide 22 is increasing, the corresponding angle between the segments of the cable 13 on either side of the guide 22' is decreasing. Thus, the turning component of the frictional force developed at guide 22' increases. Therefore, when one extremity of the lever, by movement of the cable in one direction, has been rotated to a position where the turning force is insufficient to further rotate the lever, the other extremity has rotated to a position where, if the cable is moved in the other direction, sufficient turning force will be available to reverse the rotation of the lever.

Figure 7:
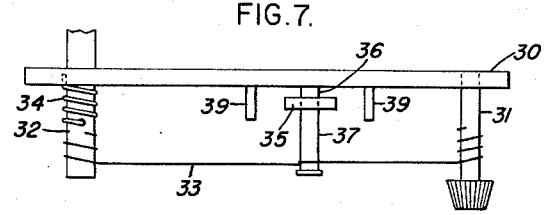
Figure 7 is a plan view of the embodiment of my invention shown in Figure 6.

Due to space limitations, or other reasons, it may not be convenient to provide a continuous flexible drive means. For such situations, I provide another form of my invention. In Figures 6 and 7 there is shown a supporting element 30 which may be part of a television chassis or any device in which a two-speed drive is desired. Rotatably mounted in the support is a shaft 31. The means mounting this shaft is of such dimensions as to provide some degree of friction to retard its rotation for a purpose to be described hereinafter. A second shaft 32 is shown mounted on the support 30 for rotation therein. This arrangement of shafts is for purposes of illustration only, as any desired arangement may be used. A flexible drive element 33 has one end wound around shaft 31 a desired number of turns and is secured thereto and has its other end wound around shaft 32 a desired number of turns and is secured thereto. A helical spring 34 surrounds the shaft 32 and is anchored at one end to the support 30 or any other suitable fixed means. The other end of the spring 34 is anchored to the shaft 32 in such a manner that the spring 34 is wound up when the shaft 32 is driven by the movement of the shaft 31. A lever 35 is pivotally mounted on the support 30 by means of a pin 36. Provided on the lever 35 is a first or upper guide 37 and mounted between the upper guide 37 and pivot 36 is a second or lower guide 38. Stop means 39 on the support 30 limit the pivoting movement of the lever 35.

The operation of this form of my invention is as follows:

Assume that shaft 31 is the drive shaft, and that lever 35 is an initial position wherein it engages the stop 39 on its left hand side. As the shaft 31 is rotated counterclockwise, the perpendicular component of the friction developed where the flexible drive element 33 passes over the guide 37 moves the lever 35 clockwise until it engages the right hand stop 39. The pivoting lever carries the guide 38 along with it and the friction between the flexible drive element 33 and the guide 38 prevent relative movement therebetween so the shaft 32 is rotated in a clockwise direction. Since the distance from pivot 36 to guide 37 is greater than that from pivot 36 to guide 38 more cable will be wound on shaft 31 than is wound off shaft 32 and a slower movement of shaft 32 relative to shaft 31 will result. After the lever 35 is stopped by the right hand means 39, all of the cable being wound on shaft 31 must come from that wound on shaft 32 and the subsequent action is the normal relative speeds of these two shafts.

It has been pointed out above that as the shaft 32 rotates in a clockwise direction in the arrangement shown, energy is stored in the spring 34. Also as stated above, there is some degree of friction in the means mounting the shaft 31 for rotation in the support 30. This friction is of such a degree that the force present is slightly greater than that capable of being exerted by the spring 34 at any time. Thus the driving force may be taken from the shaft 31 at any time and it will remain at a desired position. Further, when it is desired to rotate the shafts 31 and 32 in the direction opposite to the one described above, a slight force of an amount sufficient to overcome the friction in the mounting is applied to the shaft 31 so that the spring 34 may unwind, rotating the shaft 32 to wind the cable 33 thereon. If this operation is carried out when the lever 35 is contacting the right hand stop 39, there will be no relative movement between the cable 33 and the lever and the slower relative movement of shafts 31 and 32 will ensue. After the lever 35 contacts the left hand stop 39, further movement of the shaft 31 to overcome the fractional force in its mounting permits the spring 34 to further unwind and wind more cable on the shaft 32 to yield the faster relative movement of the two shafts.

It may be seen therefore, that in this form of my invention that the two relative shaft speeds are provided for as in the first form described.

Figure 8:
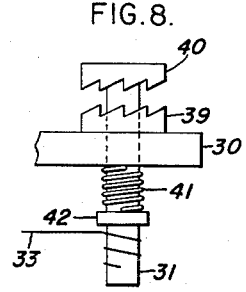
Figure 8 is a partial plan view of the form of Figure 6 further modified in one of its details.

A further modification of the embodiment in Figures 6 and 7 is shown in Figure 8. Instead of providing friction between shaft 31 and support 30 the following arrangement is used: Mounted on the support 30 is ring 39 having one way ratchet teeth formed therein. On one extremity of this shaft I provide an enlarged flange 40 having ratchet teeth matching those of ring 39 and normally engageable therewith. A coil spring 41 surrounds the shaft 30 and is mounted between the support 30 and a collar 42 to normally urge the shaft outwardly, as shown, and the teeth on ring 39 and flange 40 into engagement with each other.

The operation of this form of my invention is similar to that of the forms of Figures 6 and 7 except that the cooperating ratchet teeth on members 39 and 40 hold the transmission in a desired setting. Whenever it is desired to permit the energy stored in the spring 34 to be effective to wind the cable 33 on the shaft 32, the shaft 31 is pushed inwardly against the action of the spring 41, disengaging the ratchet teeth.

My invention is not limited to the provision of a single speed changing lever in a transmission system. It may be found advantageous to provide a plurality of such levers, each pivoting within different limits determined by different stop settings. The flexible drive means is trained over the guides of a first speed changing lever as shown in the drawings and over the guides on one or more subsequent levers in a reverse or similar manner. As the flexible drive means is wound on the driving shaft, the first speed changing lever will pivot between its limits as will the subsequent levers. As soon as one speed changing lever reaches the limit of its pivot, the flexible drive will slip over its guides and it will no longer be effective to vary the speed of the load. The other levers will be effective until stopped and thus as many speed changes as there are levers will be obtained. In this manner it is possible to provide a transmission system incorporating as many speed increases and/or decreases as desired.

I also contemplate that any desired winding of the flexible drive element may be utilized so the relative directions of rotations of the driving shaft and driven load may be varied as desired.

The various embodiments of my device thus provided are capable of automatically providing at least two speeds in a driven member without the necessity of a complicated mechanical movement. The two speeds are available any time the direction of rotation of the driving shaft is changed and rotation of the driving shaft is continued after the lever ceases to pivot. When the device is applied to the tuning of radio and television receivers it conforms to the almost universal mode of operation now in use.

While I have shown and described particular embodiments of my invention, it will be obvious to those skilled in the art that changes and modifications may be made without departing from my invention in its broader aspects and I therefore aim in the appended claims to cover all such changes and modifications as fall within the true spirit and scope of my invention.

What I claim as new and desire to secure by Letters Patent of the United States is:

1. A multi-speed transmission combination comprising a support, a driving member rotatably mounted on said support, a driven element rotatably mounted on said support, a lever pivotally mounted on said support, stop means limiting the movement of said lever, guides on said lever, a flexible drive element trained over and movable on said driving member, said guides and said driven element whereby said driven element can be rotated in response to rotation of the driving member, said flexible element pivoting said lever between said stops for reducing the relative movement between said driving member and said driving element on a predetermined cycle of operation and thereafter sliding over said guides thereby increasing the relative movement of said driving member relative to said driving member.

2. A multi-speed transmission system comprising a driving member, a driven load, pivoted speed changing means, said speed changing means having first and second guide means mounted thereon each spaced a different distance from a pivot, a flexible drive element trained around and movable on said driving member, said guide means and said driven load whereby said driven load may be moved in response to the movement of said driving member, means for tensioning said flexible drive element so that when it moves, friction where it contacts one of said guide means will prevent relative movement therebetween and a component of the force thereby produced will cause said speed changing means to pivot, the tension in said flexible drive element also developing friction where it contacts other of said guide means to prevent relative movement therebetween, and the amount by which said flexible drive element moves on either side of said speed changing means will vary with the ratio of the distance of said first and second guide means from a pivot of said speed changing means.

3. The transmission system of claim 2 including stops limiting movement of said speed changing means whereby after said speed changing means has reached a limit of movement, the flexible drive element will slip over said first and second guide means.

4. A transmission system comprising a driving element, a driven element, a lever, means mounting said lever for pivoting movement thereabout, first guides provided on said lever on either side of said mounting means at a predetermined distance therefrom, second guides provided on said lever on either side of said mounting means at a lesser distance than said predetermined distance, a flexible drive means wound around and movable on said driving element, around one of said first guide elements, around one of said second guide elements, around said driven element, around another of said second guide elements, around another of said first guide elements and returned to said driving element, said flexible drive means pivoting said lever on one predetermined actuation of said drive means and sliding over said guide means on a continued movement of said drive means.

5. A transmission system comprising a support, a driving member rotatably mounted in said support, a driven member rotatably mounted in said support, a lever, means pivotally mounting said lever on said support, a first guide mounted on said lever a predetermined distance from the pivot thereof, a second guide mounted on said lever at a distance less than said predetermined distance of said first guide from the pivot of said lever, a flexible drive means wound around said driving member, passing over said first and second guides and wound around said driven member, a helical spring engaged with said support and said driven member and adapted to be wound up when said driven member is rotated in one direction, and means provided on the mounting of said driving member exerting a holding force to resist the action of said spring.

6. A transmission system as defined in claim 5 wherein said last mentioned means is constituted by a ratchet toothed element on said support and a second ratchet toothed element on said driving member engageable therewith.

7. In a tuning system for devices receiving electromagnetic radiation, a variable tuner for selectively determining the frequency of radiation to be received, a driven shaft coupled to said tuner whereby it may be varied, a driving shaft, flexible drive means connecting said driving and driven shafts, a lever pivotally mounted adjacent to said tuner, guides secured to said lever over which said flexible drive means passes and spaced from the pivot thereof, said guides constraining movement of said flexible drive means so that initial rotation of said drive shaft in a first direction opposite to that in which it had previously been rotated will cause said flexible drive means to pivot said lever and the movement of said driven shaft relative to said drive shaft will be thereby reduced and slow variation of the tuner will be had, means limiting the movement of said pivoted lever whereby after said lever has been stopped by said limiting means the flexible drive will no longer be constrained in its movement and the actual movement of said driven shaft relative to said driving shaft rotation will be increased and faster variation of the tuner will be had.

8. In a transmission system, a speed changing device comprising a first and second guide means, means for pivoting said first and second guide means about a point, said first and second guide means being spaced at different distances from said point, a flexible element slidably carried by said first and second guide means, means for actuating said flexible element into movement for pivoting said guides a predetermined distance after which said flexible element slides over said first and said second guide means.

References Cited in the file of this patent

UNITED STATES PATENTS

| | | |
|---|---|---|
| 227,401 | Wood | May 11, 1880 |
| 2,081,737 | Chittick | May 25, 1937 |
| 2,404,377 | Herbst | July 23, 1946 |
| 2,615,420 | Felt | Oct. 28, 1952 |